United States Patent
Leonard

(10) Patent No.: US 8,708,345 B2
(45) Date of Patent: Apr. 29, 2014

(54) HEAT EXCHANGER SEAL ASSEMBLY AND METHOD FOR USE WITH A VEHICLE RADIATOR AND COOLING MODULE

(75) Inventor: Stephen G. Leonard, Waterford, MI (US)

(73) Assignee: U.S. Farathane Corporation, Auburn Hills, MI (US)

( * ) Notice: Subject to any disclaimer, the term of this patent is extended or adjusted under 35 U.S.C. 154(b) by 90 days.

(21) Appl. No.: 13/467,435

(22) Filed: May 9, 2012

(65) Prior Publication Data

US 2012/0319363 A1 Dec. 20, 2012

Related U.S. Application Data

(60) Provisional application No. 61/497,321, filed on Jun. 15, 2011.

(51) Int. Cl.
*F16J 15/06* (2006.01)

(52) U.S. Cl.
USPC .......... 277/644; 277/628; 277/630; 277/637; 277/650

(58) Field of Classification Search
USPC .................. 277/628, 630, 634, 637, 644, 650
See application file for complete search history.

(56) References Cited

U.S. PATENT DOCUMENTS

| 3,774,397 A * | 11/1973 | Engdahl | 60/667 |
| 7,082,721 B2 * | 8/2006 | Whitehead | 49/490.1 |
| 2012/0048633 A1 * | 3/2012 | Williams et al. | 180/68.4 |

* cited by examiner

*Primary Examiner* — Gilbert Lee
(74) *Attorney, Agent, or Firm* — Gifford, Krass, Sprinkle, Anderson & Citkowski, P.C.; Douglas J. McEvoy

(57) ABSTRACT

A seal for use with a radiator having a plurality of edge extending and assembleable portions collectively establishing a frame around the radiator. The upper and lower extending sides can include a number of materials, not limited to a 40% calcium carbonate polypropylene. The edge extending and interconnecting sides are further constructed, in cross section, of a harder material as a flat extending first face along with an intermediate positioned snap fit portion, such as for engaging a condenser tank, as well as at least one pin receiving location. A second softer material is coextruded to an edge of the harder material and, upon assembly into a four sided frame with the upper and lower sides, is affixed both around and at least partially forwardly of the radiator face in order to redirect/funnel air to the front of the radiator.

8 Claims, 5 Drawing Sheets

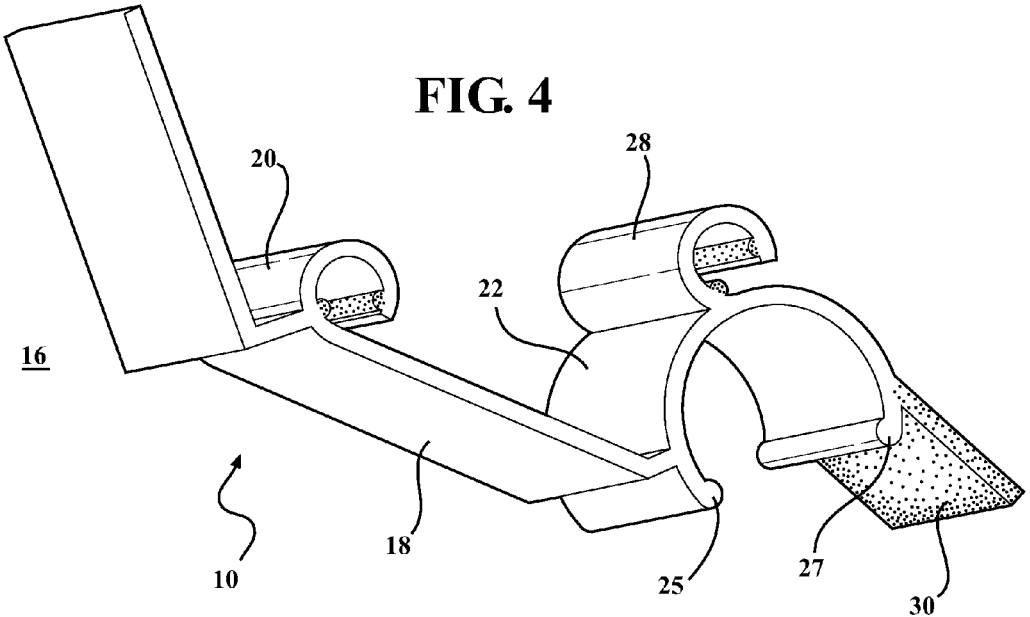
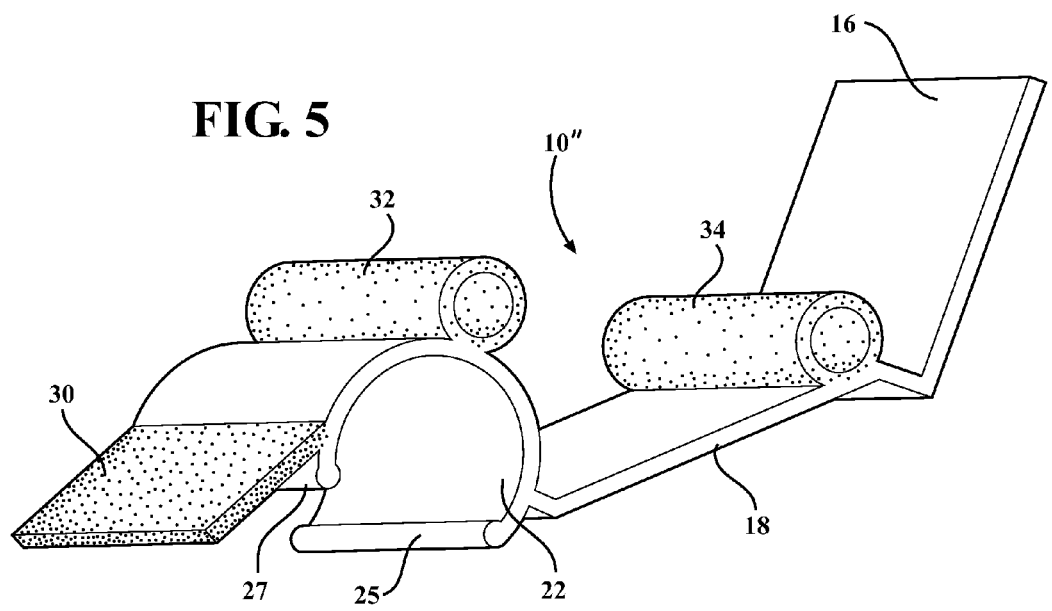

HEAT EXCHANGER SEAL ASSEMBLY AND METHOD FOR USE WITH A VEHICLE RADIATOR AND COOLING MODULE

CROSS REFERENCE TO RELATED APPLICATIONS

The present application claims the priority of U.S. Ser. No. 61/497,321 filed Jun. 15, 2011.

FIELD OF THE INVENTION

The present invention discloses a perimeter seal assembly for use with such as a vehicle radiator and which includes a plurality of frame assembleable parts. The seal assembly includes first and second side extending portions which are coextruded with at least a first harder polymer and a second softer polymer (TPE). The cross sectional profile of each side extending portion further includes a flat face defining a first extending edge for sealing to an associated front end module associated with upper and lower extending portions, a snap fit intermediate profile for attaching to an associated radiator condenser tank, and a softer (TPE) seal extending along an opposite edge for contacting side extending locations associated with the radiator face.

DESCRIPTION OF THE RELEVANT ART

The prior art is documented with examples of baffle constructions incorporated into a vehicle for assisting in directing air to a vehicle radiator and in order to maximize heat exchange between the radiator surface and the ambient surroundings. Such prior art designs often include a one piece baffle with multiple hinged sides, with the ability to package and transport in any volume being both inefficient and expensive.

SUMMARY OF THE PRESENT INVENTION

The present invention discloses a seal for use with a radiator having a plurality of edge extending and assembleable portions establishing a frame around the radiator. The upper and lower extending sides can include a number of materials, not limited to a 40% calcium carbonate polypropylene.

The edge extending and interconnecting sides are further constructed of a co-extruded material including a first harder material and a second softer material which, in cross section, depicts the harder material as a flat extending first face along with an intermediate positioned snap fit portion, such as for engaging a condenser tank, as well as at least one pin receiving location. The second softer extruded material is coextruded to an edge of the first harder material and, upon assembly into a four sided frame with the upper and lower sides, is affixed both around and at least partially forwardly of the radiator face in order to redirect/funnel air to the front of the radiator.

Additional features include the pin receiving locations including a third extruded and lower durometer material. The edge extending portions can further include a single extruded material interconnecting with additional coextruded edge extending portions.

BRIEF DESCRIPTION OF THE DRAWINGS

Reference will now be made to the attached drawings, when read in combination with the following detailed description, wherein like reference numerals refer to like parts throughout the several views, and in which:

FIG. 4 is a cross sectional profile of a slightly modified variant of side profile, similar to that depicted in FIG. 1 and better depicting the configuration of a flat face defining a first extending edge for sealing to an associated front end module associated with upper and lower extending portions, and again showing a snap fit intermediate profile for attaching to an associated radiator condenser tank, with a softer thermoplastic elastomer seal extending along an opposite edge for contacting side extending locations associated with the radiator face;

FIG. 5 is a similar profile of an alternate three material (tri-extrusion) construction in which separate and lower durometer tubes are extruded at spaced locations onto the profile and enhance seating of push pins which install through apertures in the edges of the top and bottom profiles;

DETAILED DESCRIPTION OF THE PREFERRED EMBODIMENTS

With reference to the following description, and initially to FIGS. 1-4, the present invention discloses an improved and coextruded profile generally shown at 10 for incorporation into such as a perimeter seal assembly for use with such as a vehicle radiator. As further representatively depicted in FIG. 3, mirroring side profiles 10 are arranged in end to aligning and engaging fashion with likewise mirroring top 12 and bottom 14 in order to construct a four sided frame intended to encircle and contact at least the side edges of a vehicle radiator.

The perimeter seal assembly is understood to be utilized in combination with other air directing components, such as reconfigurable three sided and flexible front (lower) and upper baffle constructions (not shown) and which are constructed of a two part/two shot injection molded material including integrally formed harder body section and softer interconnecting hinge components. According to the given application, the upper baffle can be assembled along with the lower baffle to define a four sided box-like structure around a radiator (see as depicted in phantom at 2 in FIG. 3), this in combination with the installation of the extruded seal assembly incorporating side profiles 10. In this manner, and as shown, the assembly is positioned both around and at least partially forwardly of the radiator 2.

Figure 1:
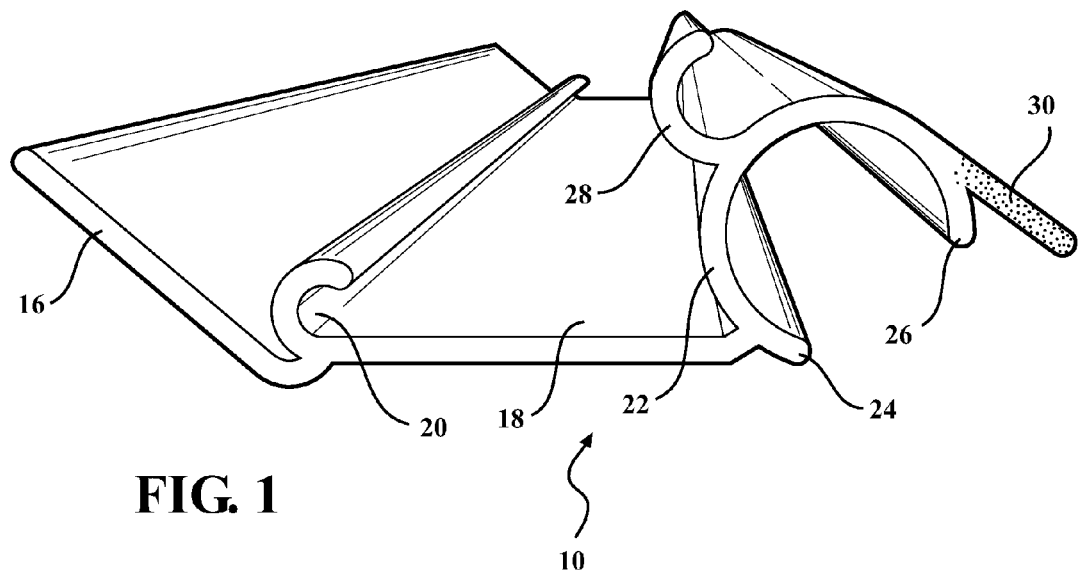
FIG. 1 is a profile of an extruded side member incorporated into a heat exchanger seal assembly according to the present invention.
Figure 2:
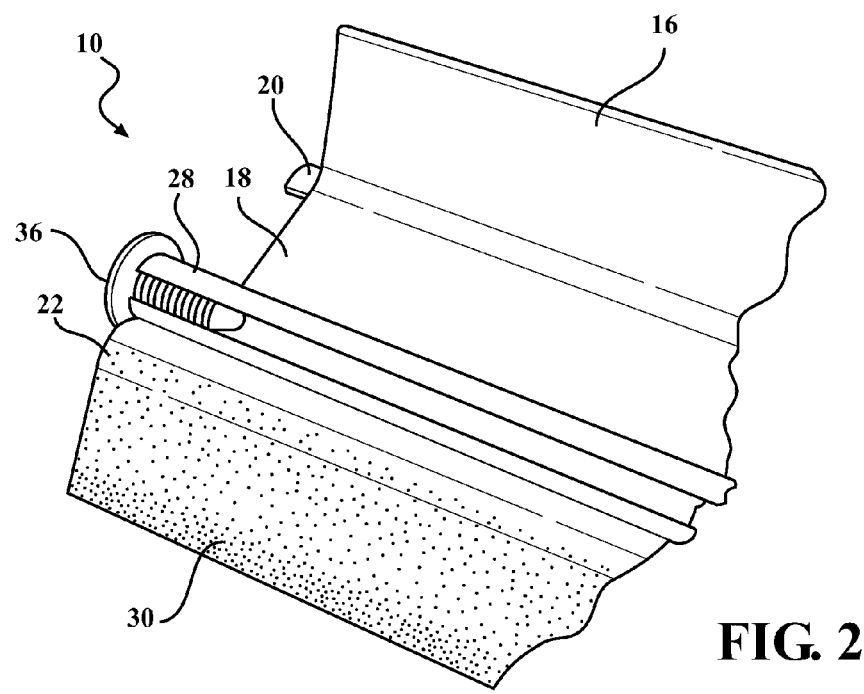
FIG. 2 is an enlarged and rotated perspective of an end section of the extruded side member depicted in FIG. 1.

As best depicted in the various side illustrations shown in FIGS. 1 and 2, the extruded profile 10 incorporates at least a first harder polymer material, e.g. such as in one non-limiting example a 40% calcium carbonate polypropylene or like material, combined with a second softer polymer, such as without limitation further including any type of thermoplastic elastomer (TPE). It is further noted that the upper and lower extending frame members 12 and 14 can likewise be constructed from a similar harder polymer material and it is further noted that their material content and/or configuration is further capable of being modified. As depicted, the cross sectional shape of each side extending profile includes a flat face 16 defining a first extending edge and such as for sealing to an associated front end module (see as best shown in assembly view of FIG. 3 with an opposite side extending profile 11 being a mirror opposite of that depicted at 10 and, with associated with the upper 12 and lower 14 extending portions, collectively assembling into the perimeter enclosing frame construction).

Figure 3:
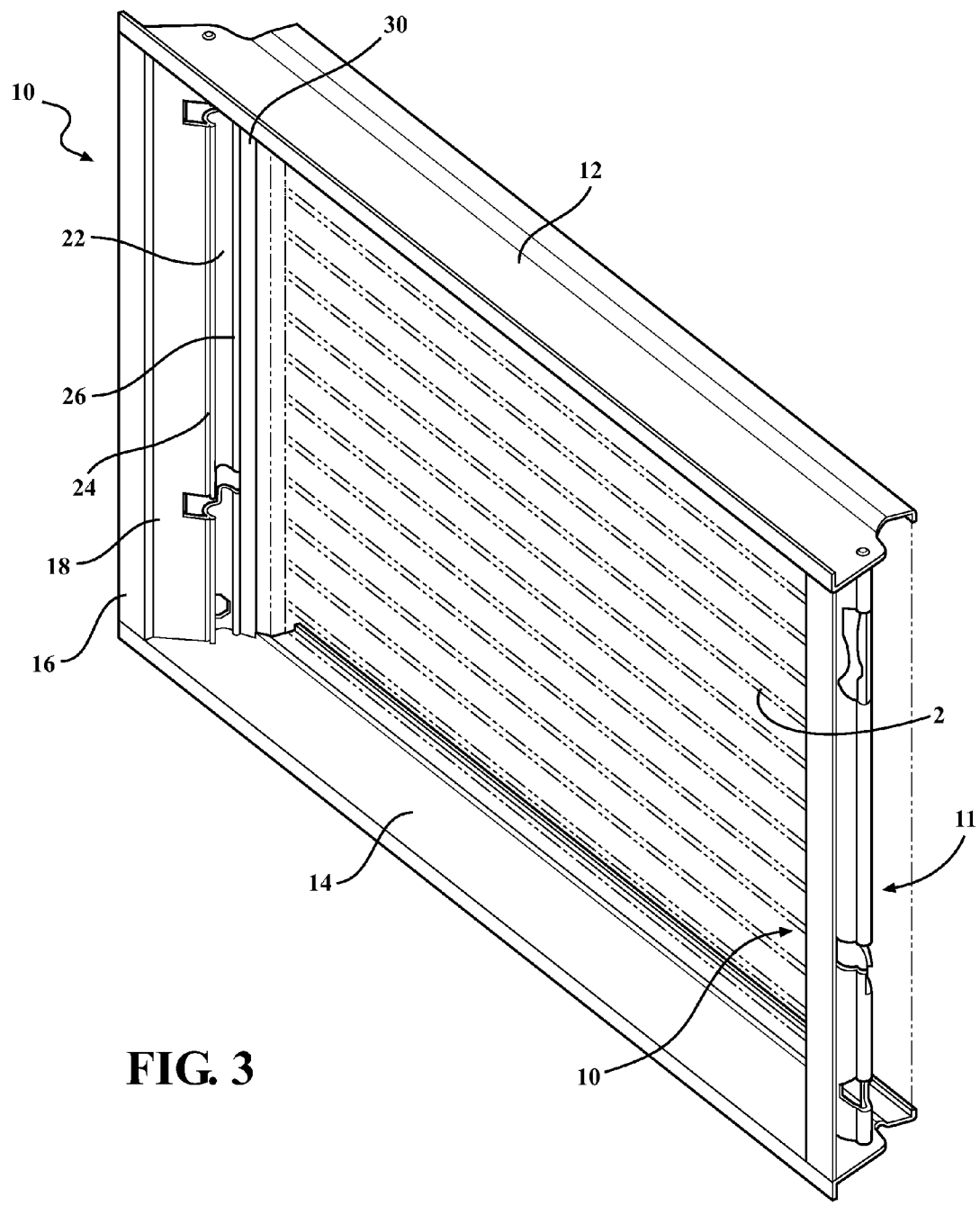
FIG. 3 is a perspective view of a frame assembled and perimeter extending seal assembly including side extruded members in combination with interconnected top and bottom defining members.

The side profile 10 depicted further includes an angularly connecting intermediate location 18 is separated from the flat face 16 via a first pin receiving profile 20 (this depicted in integrally constructed fashion in FIG. 1 on a reverse face of the profile 10 as compared to that shown in the assembly of FIG. 3). The cross sectional profile further illustrates a greater than semi-circular cross sectional shaped snap fit location. A body 22 (see again FIG. 1) extends from an angled edge of the intermediate location (planar) 18 with arcuate edges 24 and 26 (such as defining a greater than 180 degree profile) for snap attaching to an associated radiator condenser tank.

As further shown in the related variant of FIG. 4, the body 22 of largely identical and modified profile 10' exhibits bulbous projecting lip edges 25 and 27 (such as defining TPE beads for assisting in pin retention), this compared to naked edges 24 and 26 defined in corresponding edges of body 22 in the profile 10 of FIG. 1, this again for attaching to an associated radiator condenser tank (not shown).

As best shown in FIG. 1, the arcuate snap fit body portion 22 again exhibits in cross section a profile at least 180° in configuration and, as shown, more closely 210° or greater, thus ensuring secure snap fit engagement over the associated condenser tank location (not shown). A second pin receiving and likewise arcuate extruded profile is depicted at 28 on a reverse facing and generally intermediate surface location of the snap fit portion 22 (as depicted in both related variants 10 and 10' in each of FIGS. 1 and 4) and which, similar to the first pin receiving profile 20, exhibits a curled semi-circular or greater cross sectional shape for receiving in biasing engaging fashion an end installed push pin (as further depicted at 36 in each of FIGS. 2 and 6A-6C).

All of the profile components heretofore described are formed from the initially extruded/harder polymer material, and to which is coextruded the second softer material 30, such as which is shown in one non-limited variant secured to the snap fit portion 22 a proximate spaced distance from the outermost extending edge 26. In this fashion, the second material 30 defines an opposite and angularly extending edge (see again FIGS. 1 and 3) for contacting side extending locations associated with the radiator face. As further described, the second material 30 is coextruded with the first harder material, see components 16, 18 and 22, however the present invention also contemplates other forming processes which result in the creation of a similar article.

FIG. 5 illustrates a similar profile extrusion 10" to that described in FIG. 4, with the exception that a third material is employed in a three material (tri-extrusion) construction. Specifically, the pin receiving profiles 20 and 28 forming integrally defined portions of the main body extrusion are substituted by a pair of separate and lower durometer tubes 32 and 34 which are coextruded at spaced locations onto the main harder extruded profile.

Figure 6:
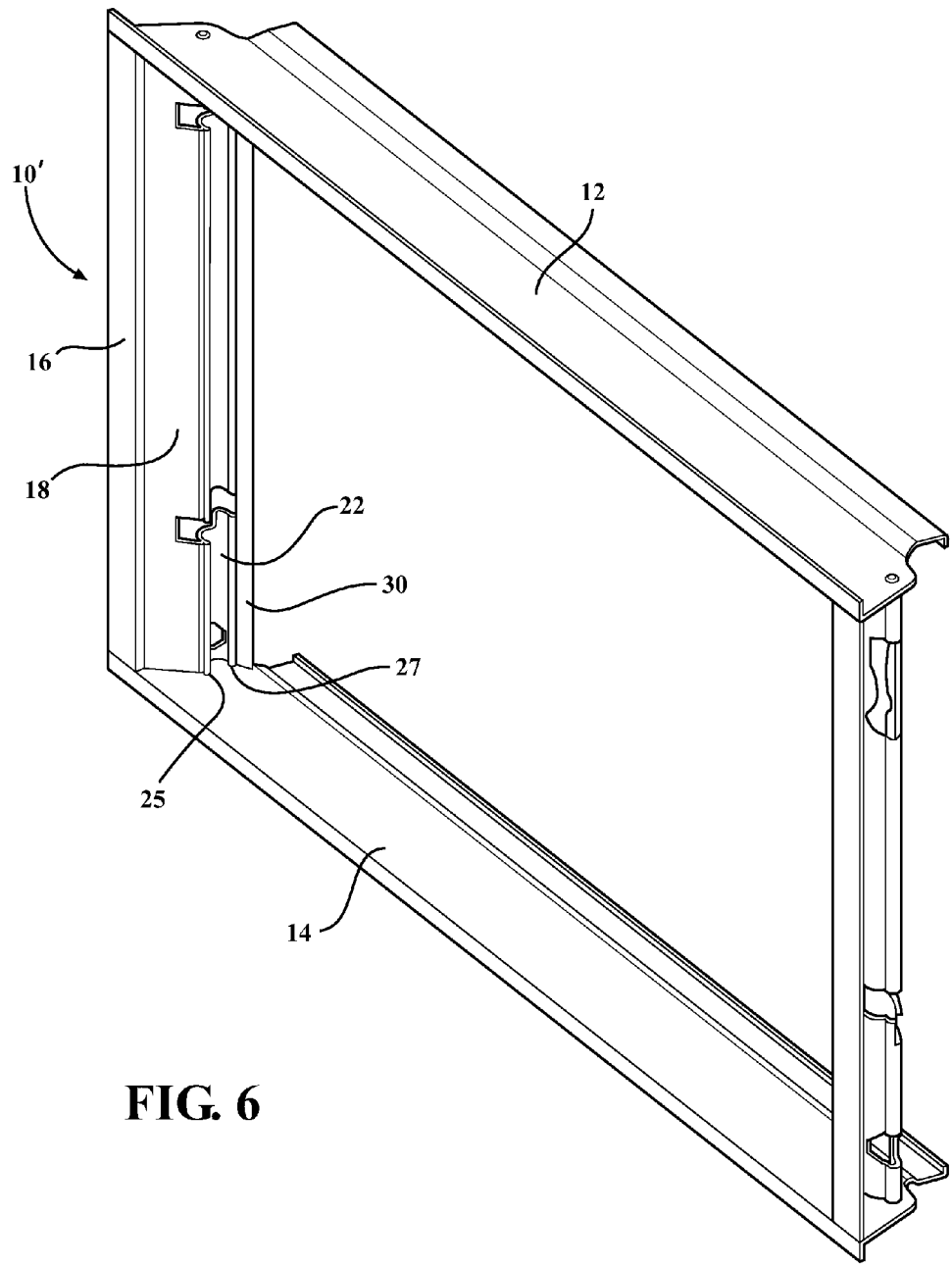
FIG. 6 is a perspective view similar to that shown in FIG. 3 and depicting the side profile of FIG. 4.
Figure 6A:
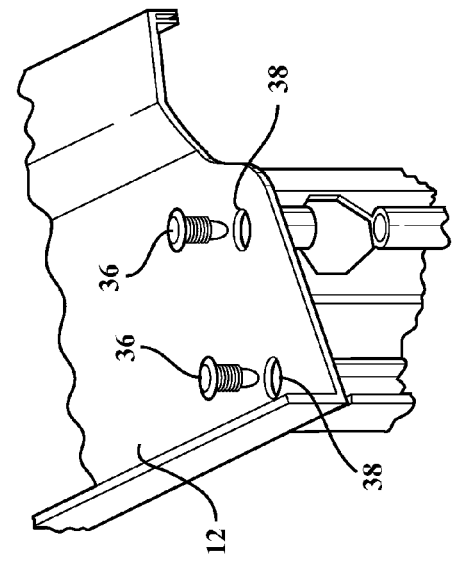
FIG. 6A is a first enlarged and partially exploded view of a perimeter edge assembly location shown in FIG. 6.
Figure 6C:
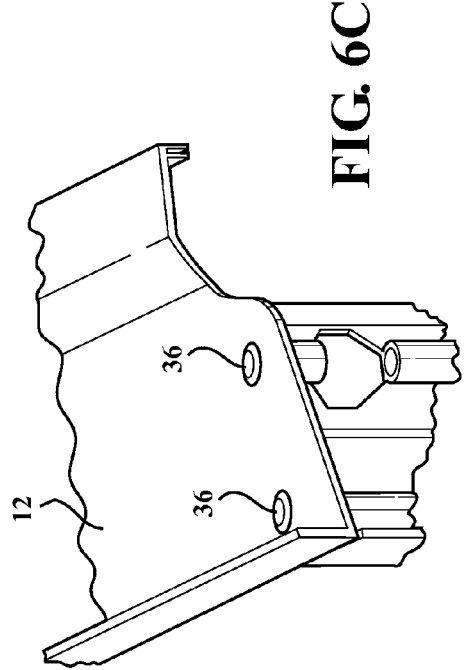
FIG. 6C is a further succeeding and fully assembled view of the perimeter edge of the seal assembly.

Referring finally to FIGS. 6-6C, a series of illustrations are given of an installation arrangement utilizing a series of push pins, see at 36, which install through aligning edge apertures 38 defined at each of the edges of the top 12 and bottom 14 profiles (for purposes of ease of illustration the top profile 12 being shown only). Upon positioning each of the pair of side profiles according to any of the variants 10, 10' or 10" between the top 12 and bottom 14 members in the manner illustrated in each of FIGS. 3 and 6, the apertures 38 align with the inserting/press fit locations associated with either of the pin receiving profile 20 and 28 (variants 10 or 10') or tri-extruded tubes 32 and 34 (variant 10").

Figure 6B:
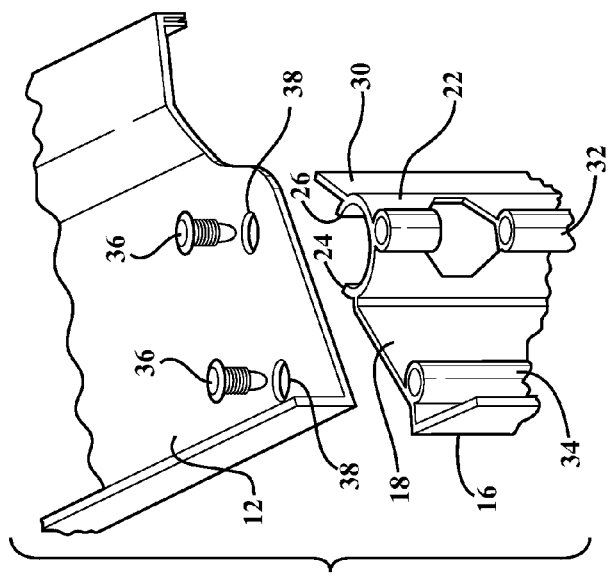
FIG. 6B is a succeeding pre-assembled view depicting the top profile in seating fashion over the side extending extrusion and prior to installation of the push pins.

As also shown in FIG. 2, the push pins 36 each further exhibit a ridged or other pseudo-serrated stem to facilitate frictional locking engagement when installed through the aperture 38, as depicted in the succession of views in FIGS. 6A-6C, and so that the pins 36 establish an inter-engaging contact with the interior of the tubes or inner configured profiles depending upon the variant employed. The multiple pieces comprising the frame assembly thus depicted in FIGS. 3 and 6 are capable of being shipped flat and quickly assembled upon successive positioning and installation of the press fit pins.

Having described my invention, other and additional preferred embodiments will become apparent to those skilled in the art to which it pertains, and without deviating from the scope of the appended claims.

I claim:

1. A perimeter extending seal assembly for use with a vehicle radiator cooling module, comprising:
    a frame surrounding the cooling module and including upper and lower spaced and parallel extending members, first and second parallel side members interconnecting with said upper and lower members;
    at least one of said interconnecting members being constructed of a co-extruded material and including a first harder material and a second softer material;
    said harder material including in cross section an elongated profile with first and second angled sides, a pair of pin receiving arcuate profiles being formed at spaced apart locations along said elongated cross sectional profile, said harder material further including, at a selected end thereof, a further arcuate profile adapted to attach to the radiator cooling module; and
    said softer material including a lip edge extending from said further arcuate profile and adapted to contact an edge location of the radiator in a sealing fashion.

2. The seal assembly as described in claim 1, said pin receiving profiles further comprising a third extruded lower durometer material.

3. The seal assembly as described in claim 1, at least one of said members further comprising a single extruded material interconnecting with additional coextruded edge extending portions.

4. A coextruded seal profile incorporated into a multi-sided and assembleable construction defining a frame about a vehicle radiator cooling module, said profile comprising:
    at least a pair of opposite side and edge extending portions which are inter-assembleable with upper and lower portions, said side extending portions each defining a co-extruded material including a first harder material and a second softer material;
    said first harder extruded material including at least a flat extending first face, an intermediate and angularly connecting portion extending from said first face, a first pin receiving arcuate profile at a boundary between said first face and intermediate portion, and an at least semi-circular cross sectional shaped snap fit portion located at an end of said intermediate portion opposite said first face which is adapted for engaging a condenser tank, a second pin receiving arcuate profile extending from an intermediate location of said snap fit portion; and said softer extruded material further exhibiting a lip edge extending from an arcuate end location of said snap fit portion and adapted to contact an edge location the radiator.

5. The invention as described in claim 4, further comprising a plurality of projecting locations defined upon a reverse face of said profile and, upon aligning with apertures formed in the upper and lower portions, adapted to receiving push pins in resistively engaging fashion.

6. The invention as described in claim 4, said reverse face projecting locations each further comprising third extruded material defining a low durometer tube.

7. The invention as described in claim 4, said reverse face projecting locations each further comprising a curled semi-circular or greater extruded cross sectional shape.

8. The invention as described in claim 4, said snap fit portion further comprising bulbous projecting lip edges.

\* \* \* \* \*